US011844367B2

(12) United States Patent
Wang et al.

(10) Patent No.: US 11,844,367 B2
(45) Date of Patent: Dec. 19, 2023

(54) VACUUM STEAM BLANCHER USING A FULL-AUTOMATIC CONVEYOR BELT

(71) Applicant: Shaanxi University of Science & Technology, Shaanxi (CN)

(72) Inventors: Dong Wang, Shaanxi (CN); Yuming Lu, Shaanxi (CN); Yuejin Yuan, Shaanxi (CN); Jixian Dong, Shaanxi (CN); Chenzhao Ma, Shaanxi (CN); Jiahao Wen, Shaanxi (CN); Zeying Zhao, Shaanxi (CN); Yi Wang, Shaanxi (CN)

(73) Assignee: Shaanxi University of Science & Technology, Xi'an (CN)

( * ) Notice: Subject to any disclaimer, the term of this patent is extended or adjusted under 35 U.S.C. 154(b) by 739 days.

(21) Appl. No.: 16/993,201

(22) Filed: Aug. 13, 2020

(65) Prior Publication Data
US 2021/0045426 A1 Feb. 18, 2021

(30) Foreign Application Priority Data
Aug. 13, 2019 (CN) .......................... 201910745165.4

(51) Int. Cl.
*A23N 12/04* (2006.01)
*A23B 7/005* (2006.01)
*A23B 7/06* (2006.01)

(52) U.S. Cl.
CPC ............ *A23N 12/04* (2013.01); *A23B 7/0053* (2013.01); *A23B 7/06* (2013.01); *A23V 2002/00* (2013.01)

(58) Field of Classification Search
CPC .......................... A23N 12/04; A23V 2002/00
USPC ............................................. 99/483
See application file for complete search history.

(56) References Cited

U.S. PATENT DOCUMENTS

| 4,927,653 A * | 5/1990 | Manvell .................... A23L 5/12 |
| | | 426/399 |
| 6,153,240 A * | 11/2000 | Tottenham .............. A23L 3/003 |
| | | 426/511 |
| 9,510,605 B2 | 12/2016 | Melnyczuk |
| 2004/0234659 A1* | 11/2004 | Linton .................... A23L 19/11 |
| | | 426/509 |
| 2005/0112255 A1* | 5/2005 | Tottenham ........... A23B 7/0053 |
| | | 426/511 |

(Continued)

FOREIGN PATENT DOCUMENTS

CN 2737165 Y 11/2005
CN 104472664 A 4/2015
(Continued)

*Primary Examiner* — Omar Flores Sanchez (57) ABSTRACT

A vacuum steam blancher using a full-automatic conveyor belt includes a blanching chamber, a pressure casing, a second vacuum pipe; and an automatic control system. The automatic control system is configured to control a steam generation system, a vacuum system, a drainage system and a material conveyor. Steam is introduced to continuously blanch materials. The vacuum steam blancher has a simple structure and reasonable design, and is easily integrated with a production line. Compared to the existing vacuum pulsed blancher that is intermittent and semi-automatic, the vacuum steam blancher of the present application realizes continuous production to meet the needs of the industrialized production.

12 Claims, 2 Drawing Sheets

(56) References Cited

U.S. PATENT DOCUMENTS

| | | | |
|---|---|---|---|
| 2009/0211274 A1* | 8/2009 | Meng | A23B 7/0053 62/93 |
| 2010/0014925 A1* | 1/2010 | Stousland | B65G 51/01 406/198 |
| 2010/0043649 A1* | 2/2010 | Maupin | A23N 12/04 99/348 |
| 2011/0072980 A1* | 3/2011 | Maupin | A23B 7/158 99/348 |
| 2014/0106045 A1* | 4/2014 | Bertocchi | A23N 1/00 99/275 |
| 2017/0035070 A1* | 2/2017 | Hastings | A23B 7/06 |

FOREIGN PATENT DOCUMENTS

| | | |
|---|---|---|
| CN | 107242287 A | 10/2017 |
| WO | 2015154150 A1 | 10/2015 |

* cited by examiner

VACUUM STEAM BLANCHER USING A FULL-AUTOMATIC CONVEYOR BELT

CROSS-REFERENCE TO RELATED APPLICATIONS

This application claims the benefit of priority from Chinese Patent Application No. 201910745165.4, filed on Aug. 13, 2019. The content of the aforementioned application, including any intervening amendments thereto, is incorporated herein by reference in its entirety.

TECHNICAL FIELD

The present application relates to agricultural product processing, and more particularly to a vacuum steam blancher using a full-automatic conveyor belt.

BACKGROUND

During the dehydration of fruit and vegetable, enzymatic browning readily takes place in fruits and vegetables due to the presence of dioxygenase and polyphenol oxidase in the fruits and vegetables, which leads to undesirable changes in the color and flavor of the fruits and vegetables, seriously affecting the commercial value of dried food. Generally, blanching can inactivate enzymes or inhibit their activities in fruits and vegetables and thus is utilized to preserve color and flavor of the fruits and vegetables. Therefore, the blanching becomes one of crucial techniques for drying of the fruits and vegetables. Traditionally, the blanching is done using hot water or atmospheric steam. However, hot water blanching easily causes a huge loss of water-soluble and heat-sensitive nutrients as well as damage to food tissue cells, etc. Atmospheric steam blanching can effectively overcome the problems in the hot water blanching technique, but air between steam and material surface has a low thermal conductivity, so heat is slowly transferred from the steam to the materials, which causes the problems that the materials are unevenly blanched or thin food pieces are blanched with a small loading capacity.

Chinese Patent Application No. 201410669783.2 discloses a vacuum-steam pulsed blancher and a method of blanching using the same. Materials are subjected to a vacuum-steam-vacuum treatment to effectively expel air on material surfaces, which allows for direct contact between high-temperature steam and the materials to uniformly and quickly raise the temperature of the materials everywhere in a blanching chamber, so that the materials are uniformly blanched. However, the blancher and the method have some disadvantages, for example, its operation is intermittent and semi-automatic. Specifically, material feeding is manually performed in a batch process. A pressure casing is manually tightened after the material feeding and then manually unscrewed after the blanching. After being taken out and then be cooled for a while, the materials are manually transferred and distributed to undergo hot air drying. The equipment and the method have low automaticity, low production efficiency and high labor intensity, which not only fails to meet the requirements of mass production and continuous process, but also easily leads to secondary pollution and material loss. After completing the blanching in each blanching cycle, exhaust steam is directly pumped into a vacuum system. However, vast amounts of heat remain in the exhaust steam and are not put into use, which causes energy wasting. In addition, the waste heat in the exhaust steam can rapidly increase the vacuum pump temperature, causing lower operation efficiency, increased energy consumption and shortened service life for the vacuum pump.

SUMMARY

Given the above, the present application aims to provide a vacuum steam blancher using a full-automatic conveyor belt, which has a reasonable structure. Through the cooperation of various systems, materials are continuously blanched by steam, having high automaticity.

The technical solutions of the present application are described as follows.

The present disclosure provides a vacuum steam blancher using a full-automatic conveyor belt, comprising:
  a blanching chamber;
  a pressure casing; and
  an automatic control system;
  wherein the blanching chamber is provided in the pressure casing; a steam distributor and a material conveyor are provided in the blanching chamber; the steam distributor is connected to a steam generation system; the blanching chamber is connected to a vacuum system and a drainage system; the bleaching chamber is provided with a material inlet and a material outlet; and the automatic control system is connected to a power supply and distribution system, and is connected to the steam generation system, the vacuum system, the drainage system and the material conveyor, respectively;
  the vacuum system comprises a water ring vacuum pump, a first vacuum pipe and a water tank; the water ring vacuum pump and the blanching chamber are in communication with each other through the first vacuum pipe that is provided between them; a vacuum sensor and a vacuum valve are provided on the first vacuum pipe; the water ring vacuum pump is connected to the water tank through an exhaust pipe and a water pumping pipe; a water inlet duct is connected to a middle of the water tank such that external water enters; a discharge valve is provided at a bottom of the water tank; and the water ring vacuum pump, the vacuum sensor and the vacuum valve are respectively connected to the automatic control system;
  the vacuum steam blancher further comprises a second vacuum pipe; the first vacuum pipe is connected to a waste heat recovery device; the second vacuum pipe is provided between the waste heat recovery device and the water ring vacuum pump; a vacuum check valve is provided on the second vacuum pipe; and the waste heat recovery device and the vacuum check valve are respectively connected to the automatic control system;
  wherein the material conveyor comprises a conveyor bracket and a power source; a photoelectric proximity switch and a plurality of conveyor rollers are fixed on the conveyor bracket; the plurality of conveyor rollers are connected to a conveyor belt; the power source is configured to drive the conveyor rollers to rotate; and the photoelectric proximity switch and the power source are respectively connected to the automatic control system;
  the conveyor bracket comprises a steam reflecting plate which is fixedly connected to a bottom of the conveyor belt; and the steam reflecting plate is configured to reflect steam that passes through the conveyor belt to bottoms of materials; and
  during operation, the materials are transferred into the blanching chamber through the material inlet from an upstream production line, and then transferred, by the material conveyor, to a predetermined position; according to preset process parameters of the automatic control system, the steam generation system and the vacuum system are switched on to blanch the materials; the blanched materials are transferred, by the material conveyor, to the material outlet and then introduced to a downstream production line; and steam condensate is discharged through the drainage system.

In some embodiments, the steam generation system comprises a steam generator and a steam pipe; the steam generator and the steam distributor are in communication with each other through the steam pipe is provided between them; a solenoid valve is provided on the steam pipe; a pressure sensor is provided on the steam generator; and the steam generator, the solenoid valve and the pressure sensor are respectively connected to the automatic control system.

In some embodiments, the steam distributor comprises a main pipe and a plurality of branch pipes; the plurality of branch pipes are symmetrically distributed along both sides of the main pipe and are communicated with the main pipe; a plurality of spray holes are provided on each of the branch pipes and linearly spaced apart along the branch pipes.

In some embodiments, the pressure casing comprises an inner casing and an outer casing; the inner casing is provided in the outer casing; and a plurality of reinforcing ribs are provided between the inner casing and the outer casing.

In some embodiments, a thermal insulator is filled between the inner casing and the outer casing.

In some embodiments, the vacuum steam blancher further comprises a permanent magnetic coupling;
  wherein a drive end of the permanent magnetic coupling is connected to the power source, and a driven end of the permanent magnetic coupling is connected to each of the conveyor rollers.

In some embodiments, each of the conveyor rollers is provided with a ceramic bearing.

In some embodiments, an inlet valve is provided in the material inlet for material feeding control; and an outlet valve is provided in the material outlet for material discharge control.

In some embodiments, the inlet valve and the outlet valve are both vacuum gate valves with knife edges.

In some embodiments, a feed baffle is provided above the material inlet and the material outlet, respectively; a discharge baffle is provided under the material inlet and the material outlet, respectively; the inlet valve is fixedly provided between the material inlet and the feed baffle of the material inlet; and the outlet valve is fixedly provided between the material outlet and the discharge baffle of the material outlet.

In some embodiments, a periphery of the material outlet is connected to a conveyor cover, and a material discharge system is provided in the conveyor cover; and the material discharge system, the inlet valve and the outlet valve are respectively connected to the automatic control system.

In some embodiments, the automatic control system comprises a centralized touch-screen controller connected to a programmable logic controller (PLC).

Compared to the prior art, the present disclosure has the following beneficial effects.

In the vacuum steam blancher of the present application, an automatic control system is adopted to control a steam generation system, a vacuum system, a drainage system and a material conveyor. Materials are continuously blanched by "vacuum-steam" blanching. The vacuum steam blancher is remarkable in its simple structure and reasonable design, and is easily integrated with a production line. The vacuum system adopts a water ring vacuum pump, which has a simple and compact structure, facilitates manipulation and maintenance, uniformly expels air and has stable and reliable operation. A waste heat recovery device recovers heat from the exhaust steam before being pumped into the water ring vacuum pump. On the one hand, the water ring vacuum pump has a decreased heating rate to ensure the operation efficiency of the water ring vacuum pump; on the other hand, the recovered heat can heat water in the steam generation system to significantly reduce the energy consumption. Compared to the existing vacuum pulsed blancher that is intermittent and semi-automatic, the vacuum steam blancher of the present application realizes continuous production, lowers energy consumption, increases production efficiency and avoids secondary pollution.

A pressure sensor in the steam generation system can monitor the steam pressure in real time. The steam pressure can be adjusted in real time by the steam generator and the solenoid valve, having high automaticity.

The steam distributor includes a main pipe and a plurality of branch pipes. A plurality of spray holes are spaced apart along the branch pipes to allow the materials to be evenly blanched.

The pressure casing has a dual-layer structure. Reinforcing ribs are arranged between two layers to improve the strength of the pressure casing, thereby improving safety and stability. Thermal insulation materials are filled between the two layers to reduce heat dissipation and save energy.

A photoelectric proximity switch is provided in the conveyor and is configured to send signals when the materials approaches, realizing automatic operation.

Each conveyor roller is connected to the power source through a permanent magnetic coupling. On the one hand, the power source drives the conveyor roller to rotate while achieving a good sealing effect; on the other hand, compared to conventional sealing methods, the sealing in the present application has satisfactory performance in high temperature steam environment, for example, the service life of sealing accessories is prolonged, and there is no pollution to food caused by volatile gas of the sealing liquid. Adequate vacuum degree and steam pressure are ensured to meet the requirements of the blanching. The materials are well blanched, and the equipment has reliable operation. In addition, the conveyor roller adopts a ceramic bearing, which can be applied under conditions of high temperature and high humidity. Compared to ordinary bearings, grease in the ceramic bearing of the present application can always stay effective, and there is no pollution to food caused by the volatilization of the grease. The ceramic bearing disclosed herein is resistant to high temperature and high humidity, realize self-lubrication and maintenance-free, and is applicable in a high vacuum.

A steam reflecting plate of the present application reflects the steam that passes through the conveyor belt and the materials to bottoms of the materials, so that the steam blanching is performed more thoroughly and uniformly with high efficiency and good effect.

A vacuum gate valve with a knife edge seals the material inlet and the material outlet and allows for rapid opening and closing to realize satisfactory sealing performance, thereby ensuring adequate vacuum degree and steam pressure for the blanching and realizing good blanching effect and reliable operation of the equipment.

After being subjected to enzyme inactivation and sterilization by blanching, the materials are transferred by the material discharge system to equipment in a subsequent procedure. During the transference, a protective cover is adopted to prevent the materials from being contaminated, thereby ensuring continuous operation of the blancher.

The automatic control system realizes the control using a PLC program. Parameters, including steam pressure, steam temperature, vacuum degree, vacuum time, vacuum duration, blanching time and the number of pulsation cycles, can be set on the centralized touch-screen controller in the automatic control system, so as to control valves, the motor and the pump in the processing, thereby allowing for automatic vacuum steam pulsed blanching.

In the drawings: 1, frame; 2, lower conveyor belt; 3, discharge baffle; 4, outlet valve; 5, electric motor; 6, steam reflecting plate; 7, conveyor rollers; 8, thermal insulator; 9, inlet valve; 10, feed baffle; 11, vacuum sensor; 12, centralized touch-screen controller; 13, upper conveyor belt; 14, power distribution box; 15, condensate drainage valve; 16, condensate pipe; 17, first vacuum pipe; 18, second vacuum pipe; 19, water inlet duct; 20, exhaust pipe; 21, water pumping pipe; 22, water ring vacuum pump; 23, water tank; 24, discharge valve; 25, water tank bracket; 26, waste heat recovery device; 27, steam generator; 28, pressure sensor; 29, steam distributor; 30, solenoid valve; 31, steam pipe; 32, vacuum check valve; 33, outer surface; 34, pressure casing; 35, conveyor belt; 36, ceramic bearing; 37, conveyor bracket; 38, vacuum valve; 39, photoelectric proximity switch; 40, permanent magnetic coupling; 41, speed reducer; 42, blanching chamber; 43, material outlet; 44, material inlet; 45, sealing gasket; 46, conveyor cover; 47, reinforcing ribs; 48, main pipe; 49, branch pipes; 50, spray holes; 51, automatic control system; 52, conveyor; 53, steam generation system; and 54, vacuum system.

DETAILED DESCRIPTION OF EMBODIMENTS

The present disclosure will be further described in detail below with reference to the accompanying drawings. The embodiments are illustrative and not intended to limit the scope of the present application.

Figure 1:
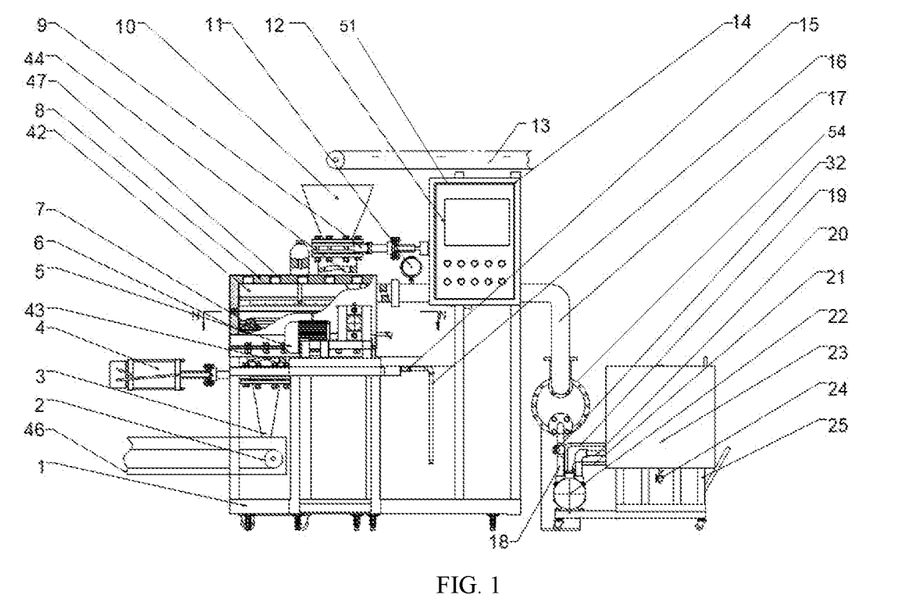
FIG. 1 is a front view of a vacuum steam blancher using a full-automatic conveyor belt according to the present application.
Figure 2:
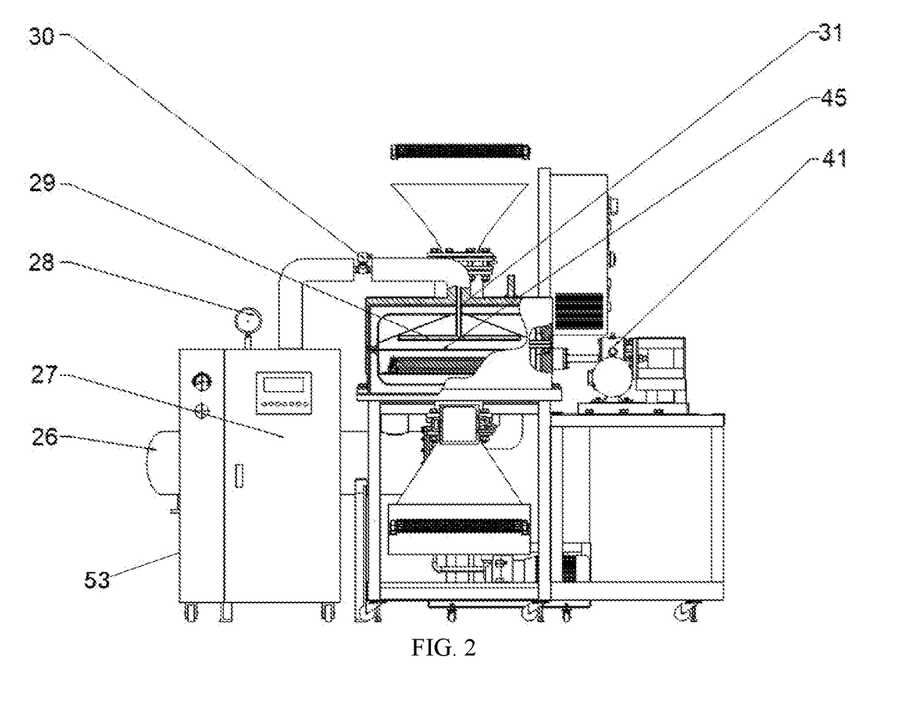
FIG. 2 is a side view of the vacuum steam blancher according to the present application.
Figure 3:
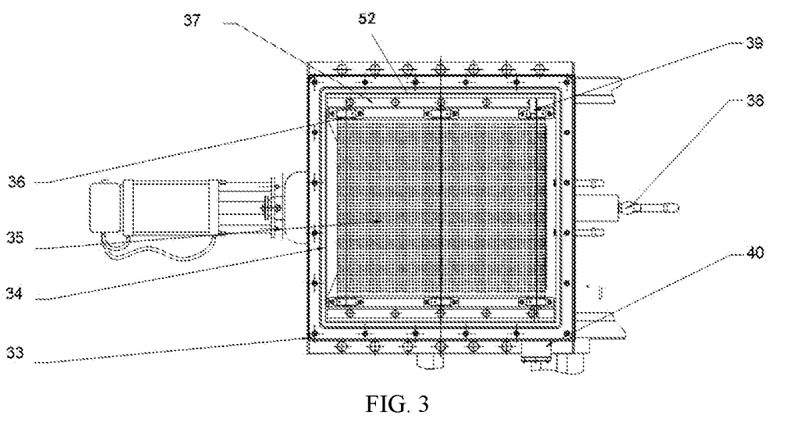
FIG. 3 is a sectional view of a blanching chamber according to the present application.

As shown in FIGS. 1-3, the present disclosure provides a vacuum steam blancher using a full-automatic conveyor belt, which includes a blanching chamber 42, a pressure casing 34, a second vacuum pipe 18 and an automatic control system 51. The blanching chamber 42 is provided in the pressure casing 34. A steam distributor 29 and a material conveyor 52 are provided in the blanching chamber 42. The steam distributor 29 is connected to a steam generation system 53. The blanching chamber 42 is connected to a vacuum system 54 and a drainage system. The blanching chamber 42 is provided with a material inlet 44 and a material outlet 43. The automatic control system 51 is connected to a power supply and distribution system, and is connected to the steam generation system 53, the vacuum system 54, the drainage system and the material conveyor 52, respectively.

The vacuum system 54 includes a water ring vacuum pump 22, a first vacuum pipe 17 and a water tank 23. The water ring vacuum pump 22 and the blanching chamber 42 are in communication with each other through the first vacuum pipe 17 that is provided between them. A vacuum sensor 11 and a vacuum valve 38 are provided on the first vacuum pipe 17. The water ring vacuum pump 22 is connected to the water tank 23 through an exhaust pipe 20 and a water pumping pipe 21. A water inlet duct 19 is connected to a middle of the water tank 23 such that external water enters. A discharge valve 24 is provided at a bottom of the water tank 23. The water ring vacuum pump 22, the vacuum sensor 11 and the vacuum valve 38 are respectively connected to the automatic control system 51.

The first vacuum pipe 17 is connected to a waste heat recovery device 26. The waste heat recovery device 26 and the water ring vacuum pump 22 communication with each other through the second vacuum pipe 18 that is provided between them. A vacuum check valve 32 is installed on the second vacuum pipe 18. The waste heat recovery device 26 and the vacuum check valve 32 are respectively connected to the automatic control system 51.

The material conveyor 52 includes a conveyor bracket 37 and a power source. A photoelectric proximity switch 39 and a plurality of conveyor rollers 7 are fixed on the conveyor bracket 37. The plurality of conveyor rollers 7 are connected to a conveyor belt 35. The power source is configured to drive the conveyor rollers 7 to rotate. The conveyor rollers 7 are powered by the power source provided outside the blanching chamber 42. The photoelectric proximity switch 39 and the power source are respectively connected to the automatic control system 51.

The conveyor bracket 37 includes a steam reflecting plate 6 which is fixedly connected to a bottom of the conveyor belt 35. The steam reflecting plate 6 can reflect the steam that passes through the materials and the conveyor belt 35 to bottoms of the materials to make the materials be blanched more evenly and thoroughly.

During the processing, the materials are transferred into the blanching chamber 42 through the material inlet 44 from an upstream production line, and then transferred, by the material conveyor 52, to a predetermined position. According to preset process parameters of the automatic control system 51, the steam generation system 53 and vacuum system 54 are switched on to blanch the materials. Then the blanched materials are transferred, by the material conveyor 52, to the material outlet 43, and then introduced to a downstream production line. Steam condensate is discharged through the drainage system.

The automatic control system is adopted to control the steam generation system 53, the vacuum system 54, the drainage system and the material conveyor 52. The materials are continuously blanched by steam. The vacuum steam blancher is remarkable in its simple structure and reasonable design, and can be easily integrated with a production line. The vacuum system adopts a water ring vacuum pump 22, which has a simple and compact structure, facilitates manipulation and maintenance, uniformly expels air and has stable and reliable operation. A waste heat recovery device recovers the waste heat in the steam after the blanching, and the waste heat recovery is carried out before the steam is pumped into the water ring vacuum pump 22. On the one hand, the water ring vacuum pump 22 has a decreased heating rate to ensure the operation efficiency of the water ring vacuum pump; on the other hand, the waste heat can heat water in the steam generation system to significantly reduce the energy consumption. Compared to the existing vacuum pulsed blancher that is intermittent and semi-automatic, the vacuum steam blancher of the present application realizes continuous production, lowers energy consumption, increases production efficiency and overcomes secondary pollution.

The photoelectric proximity switch 39 is installed on the conveyor bracket 37 and at an end of the conveyor belt 35. The photoelectric proximity switch 39 is configured to detect the conditions of the materials on the conveyor belt 35. A shaft of a speed reducer 41 and a shaft of each conveyor roller 7 are connected through a permanent magnetic coupling 40. The speed reducer 41 is connected to an electric motor 5, externally provided in front of the pressure casing 34 and fixed on a frame 1. The electric motor 5 provides power for an internal conveyor system. The photoelectric proximity switch can be an M18 photoelectric proximity switch, which can normally work under high temperature and high humidity. The conveyor belt 35 is a specialized food-safe Teflon grid conveyor belt, which has square holes with a width of 500 mm.

The steam generation system 53 includes a steam generator 27, a steam pipe 31, a pressure sensor 28, a solenoid valve 30 and a steam distributor 29. Provided between the steam generator 27 and the steam distributor 29 is the steam pipe 31 through which the steam generator 27 is communicated with the steam distributor 29. A solenoid valve 30 is provided on the steam pipe 31. The steam generator 27 is provided with a pressure sensor 28. The steam generator 27, the solenoid valve 30 and the pressure sensor 28 are respectively connected to the automatic control system 51. The steam generator 27 is located outside the pressure-bearing shell 34. Specifically, the steam generator 27 is located behind the pressure casing 34. The steam pipe 31 is connected to the pressure casing 34. The solenoid valve 30 is provided on the steam pipe 31. The pressure sensor 28 is installed above the steam generator 27. The pressure sensor 28 can monitor the steam pressure in real time. The steam distributor 29 is arranged in the pressure casing 34. The steam distributor 29 is connected to the steam pipe 31 and is located above the conveyor belt 35.

The pressure sensor 28 in the steam generation system 53 can monitor the steam pressure in real time. The steam pressure can be adjusted in real time through the steam generator 27 and the solenoid valve 30, involving high automaticity.

Figure 4:
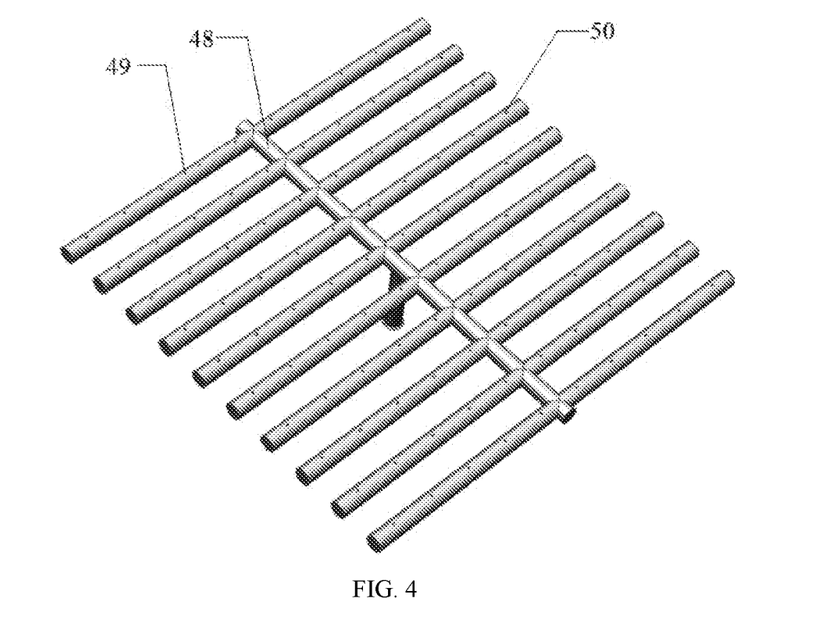
FIG. 4 is a stereo view of a steam distributor according to the present application.

As shown in FIG. 4, the steam distributor 29 includes a main pipe 48 and a plurality of branch pipes 49. The plurality of branch pipes 49 are symmetrically distributed along both sides of the main pipe 48 and are communicated with the main pipe 48. A plurality of spray holes 50 are provided on each of the branch pipes 49 and linearly spaced apart along the branch pipes 49. The steam distributor 29 is a multi-circuit flow distributor. The number of the branch pipes 49 can be 10-30. Both the main pipe 48 and the branch pipes 49 can be made of 304 austenitic stainless steels having a diameter of 15 mm and a wall thickness of 1.5 mm. The branch pipes 49 are welded to the main pipe 48. There are 50-150 spray holes 50 that are circular on the main pipe 48 and the branch pipes 49. Each spray hole has a diameter of 3 mm. The spray holes 50 are linearly spaced apart along the branch pipes 48. The steam generated by the steam generator 27 passes through the steam pipe 31, then enters the steam distributor 29, the main pipe 48 and the branch pipes, and evenly ejected from the spray holes 50 to blanch the materials. The steam pipe 31 is wrapped with a thermal insulator 8. The vacuum system 54 includes a water ring vacuum pump 22, a vacuum valve 38, a waste heat recovery device 26, a vacuum check valve 32, a vacuum sensor 11, a first vacuum pipe 17, a water tank 23 and a water tank bracket 25. The vacuum pump 22 is located below the pressure casing 34. The first vacuum pipe 17 is connected to the pressure casing 34. The first vacuum pipe 17 is provided with a vacuum sensor 11 and a vacuum valve 38. An end of the waste heat recovery device 26 is connected to the first vacuum pipe 17. The other end of the waste heat recovery device 26 is connected to the second vacuum pipe 18. The vacuum check valve 32 is installed on the second vacuum pipe 18. The water ring vacuum pump 22 is connected to the water tank 23 through the exhaust pipe 20 and the water pumping pipe 21. A water inlet duct 19 is connected to a middle of the water tank 23 such that external water enters. The water tank 23 is fixed on the water tank bracket 25. A discharge valve 24 is installed at a bottom of the water tank 23. The vacuum system 54 is connected to the pressure casing 34 to create a vacuum. The first vacuum pipe 17 is wrapped with a thermal insulator 8.

In an embodiment, the vacuum steam blancher further includes a frame 1. The pressure casing 34 is fixed on the frame land is square with a cavity. The pressure casing 34 includes an inner casing and an outer casing. The inner casing is provided in the outer casing. A plurality of reinforcing ribs 47 are provided between the inner casing and the outer casing. The inner casing is made of stainless steel with a thickness of 4-8 mm and reinforced by the reinforcing ribs 47. The reinforcing ribs 47 are made of channel steels having a width of 50 mm, a depth of 37 mm and a thickness of 4.5 mm, and an outer surface 33 of the outer casing is made of stainless steel. A thermal insulator 8, having a thickness of 40-120 mm, is filled between the inner casing and the outer casing. Specifically, the thermal insulator 8 is thermal insulation materials, such as rock wool, glass wool. These arrangements can increase the strength of the pressure casing 34, and improve safety and stability, and the filled insulation materials can reduce heat dissipation and save energy.

The blanching chamber 42 is provided in the pressure casing 34 to allow the blanching to be performed therein. The blanching chamber 42 is located in the pressure casing 34. A condensate pipe 16 is provided in the bottom of the pressure casing 34 and between the condensate discharge valve 15 and the blanching chamber 42 such that they can be communicated with each other. The condensate water generated during the blanching is drained from the condensate pipe 16.

The waste heat recovery device 26 can be a thermotube typed heat recovery device. A thermotube in the waste heat recovery device is a heat transfer element with extremely high thermal conductivity to greatly improve waste heat recovery efficiency, and only one heat pipe is required, which facilitated is assembly and replacement, involving simple maintenance and low maintenance cost. The waste heat recovery device 26 is installed on the first vacuum pipe 17 to recover the steam waste heat after the blanching. The recovered steam waste heat can be used to heat water in the steam generator 27. In addition, the steam sucked by the water ring vacuum pump 22 has a lower temperature, so that the water ring vacuum pump 22 has a decreased heating rate and thus maintains efficiency.

A conveyor system of the present application is divided into an internal conveyor system and an external conveyor system. The external conveyor system includes an upper conveyor belt 13, a lower conveyor belt 2 and a conveyor cover 46. The upper conveyor belt 13 is located directly above a feed baffle 10, and the lower conveyor belt 2 is located directly under a discharge baffle 3. The conveyor cover 46 is installed outside the lower conveyor belt 2 and is formed by welding stainless steel plates. The conveyor cover 46 is a hollow cuboid. An opening is provided on the conveyor cover 46 and directly below the discharge baffle 3. The opening has the same shape and size as the discharge baffle 3 and is connected to the discharge baffle 3. Through the opening, the materials reach the lower conveyor belt from the discharge baffle 3. In the process of being introduced to a downstream production line, the materials on the lower conveyor belt are covered by the conveyor cover 46 to prevent contaminants. The external conveyor system ensures continuous processing of the blancher.

The internal conveyor system includes the conveyor belt 35, the conveyor rollers 7, the conveyor bracket 37, the electric motor 5, the speed reducer 41, the photoelectric proximity switch 39, the steam reflecting plate 6 and a ceramic bearing 36 with a stainless steel support. The conveyor rollers 7 are connected to the power source through the permanent magnetic coupling 40. The ceramic bearing 36 is provided on each of the conveyor rollers 7. Except for the electric motor 5 and the speed reducer 41, the remaining parts of the internal conveyor system are all arranged in the pressure casing 34. The conveyor belt 35 is located under the steam distributor 29 and supported by the conveyor rollers 7. The conveyor rollers 7 are fixed on the conveyor bracket 37 which is connected to the pressure casing 34. The steam reflecting plate 6 is provided at the bottom of the conveyor belt 35 and on the conveyor bracket 37.

A sealing system of the present application includes an inlet valve 9, an outlet valve 4, the feed baffle 10, the discharge baffle 3, a sealing gasket 45 and the permanent magnetic coupling 40. The feed baffle 10 is provided directly above the material inlet 44 and the material outlet 43, respectively. The discharge baffle 3 is provided directly below the material inlet 44 and the material outlet 43, respectively. The inlet valve 9 is arranged between the material inlet 44 and the feed baffle 10 of the material inlet, and the outlet valve 4 is arranged between the material outlet 43 and the discharge baffle 3 of the material outlet.

The inlet valve 9 is configured to control the feeding of the materials, and the outlet valve 4 is configured to control the discharging of the materials. The inlet valve 9 and the outlet valve 4 are both vacuum gate valves with knife edges. A periphery of the material outlet 43 is connected to the conveyor cover 46. A material discharge system is provided inside the conveyor cover 46. The material discharge system, the inlet valve 9 and the outlet valve 4 are respectively connected to the automatic control system 51. The sealing gasket 45 is configured to seal upper and lower parts of the pressure casing 34. A drive end of the permanent magnetic coupling 40 is connected to the power source, and a driven end of the permanent magnetic coupling 40 is connected to each of the conveyor rollers 7.

A shaft of each conveyor roller 7 and a shaft of the electric motor 5 are sealed by the permanent magnetic coupling 40. The permanent magnetic coupling can adopt IPMC03, which can withstand higher pressure and achieve a non-contact full-enclosed seal for components that need to be sealed.

The automatic control system 51 includes a programmable logic controller (PLC) and a centralized touch-screen controller 12. The centralized touch-screen controller 12 is connected to the pressure sensor 28, the solenoid valve 30, the steam generator 27, the vacuum pump 22, the vacuum valve 38, the vacuum check valve 32, the vacuum sensor 11, the electric motor 5, the photoelectric proximity switch 39, the upper conveyor belt 13 and the lower conveyor belt 2, respectively. These elements are all arranged on the steam generator 27. The centralized touch-screen controller 12 can realize data display and control during the blanching, thereby realizing continuous vacuum steam pulsed blanching. The automatic control system adopts PLC program to realize control. The centralized touch-screen controller 12 control valves, the motor and the pump in the processing according to preset values or measured values of parameters including steam pressure, steam temperature, vacuum degree, vacuum time, vacuum duration, blanching time and the number of pulsation cycles, thereby allowing for automatic vacuum steam pulsed blanching.

A power distribution box 14 is provided to safely distribute electricity to all systems as well as all components.

The blanching in the present application is implemented through the following processes.

1) Parameter Setting

Appropriate values of parameters such as the steam pressure value, the steam temperature value, the vacuum degree, the vacuum duration, the blanching time, the number of pulsation cycles are set on the centralized touch-screen controller 12, and then all the systems are switched on.

2) Material Conveying

The upper conveyor belt 13 and the conveyor belt 35 are activated, and the inlet valve 9 is opened. The upper conveyor belt 13 and the conveyor belt 35 move slowly at a speed of 0.1 m/s. The materials are moved by the upper conveyor belt 13 to the conveyor belt 35 in the blanching chamber 42 through the feed baffle 10 and inlet valve 9. When the photoelectric proximity switch 39 detects that the materials arrive at a predetermined position, the upper conveyor belt 13 and the lower conveyor belt 2 stop working, and the inlet valve 9 is closed.

3) Vacuum Pumping

The vacuum valve 38 is automatically opened and the water ring vacuum pump 22 is automatically started under the cooperation of all the systems. When the vacuum sensor 11 detects that the vacuum level reaches the set value, vacuum pumping is continuously performed for 30-60 s according to the set vacuum duration in the centralized touch-screen controller 12. Subsequently, the vacuum valve 38 is closed, and the vacuum pump 22 stops working, thereby completing the vacuum pumping. At this time, air between steam and the material surface and air inside the materials are completely removed.

4) Steam Blanching

The solenoid valve 30 is opened to introduce steam. The blanching lasts for 30-120 s according to the set blanching time. The steam is evenly distributed by the steam distributor 29 and then directly sprayed on the material surface to rapidly heat the material surface to a required temperature, thereby realizing blanching, enzyme inactivation and sterilization. After the blanching time reaches the set value, the solenoid valve 30 is closed, at this time, the steam blanching is executed once.

5) The processes (3)-(4) are executed once to complete one vacuum-steam pulsed blanching cycle. The processes (3)-(4) are automatically repeated to complete the pulsation cycles 1-3 times according to the set number of pulsation cycles.

6) Transportation of the Blanched Materials

The outlet valve 4 is automatically opened. The conveyor belt 35 and the lower conveyor belt 2 run simultaneously. The materials fall down to the lower conveyor belt 2 from the conveyor belt 35 through the outlet valve 4 and the discharge baffle 3. The materials on the lower conveyor belt 2 are protected by the conveyor cover 46 in the process of being transferred to a downstream production line. At the same time, the condensate drainage valve 15 is automatically opened to discharge the condensate water generated during the blanching. When the photoelectric proximity switch 39 detects that there are no materials on the conveyor belt 35, the conveyor belt 35 stops running, and the outlet valve 4 is closed. So far, a batch of materials are completely blanched, and next batch of materials can be prepared to undergo the same treatment as the previously blanched materials. After completing each pulsed blanching cycle, exhaust steam pumped in the process (3) firstly enters the waste heat recovery device 26 through the first vacuum pipe 17 for waste heat recovery, and then enters the water ring vacuum pump 22 and the water tank 23, thereby effectively slowing down the temperature rise of the vacuum pump. The recovered heat energy can be used to heat water in the steam generator 27 or be supplied for other processing, reducing energy consumption.

The vacuum steam blancher provided in the present application is applicable to blanch agricultural products, such as most of fruits and vegetables, and Chinese herbal medicines.

The above embodiments are merely illustrative and can be modified according to on-site situations. It should be understood that any changes, improvements and other embodiments made by those skilled in the art shall fall within the scope of the present disclosure.

What is claimed is:

1. A vacuum steam blancher using a full-automatic conveyor belt, comprising:
   a blanching chamber;
   a pressure casing; and
   an automatic control system;
   wherein the blanching chamber is provided in the pressure casing; a steam distributor and a material conveyor are provided in the blanching chamber; the steam distributor is connected to a steam generation system; the blanching chamber is connected to a vacuum system and a drainage system; the bleaching chamber is provided with a material inlet and a material outlet; and the automatic control system is connected to a power supply and distribution system, and is connected to the steam generation system, the vacuum system, the drainage system and the material conveyor, respectively;
   the vacuum system comprises a water ring vacuum pump, a first vacuum pipe and a water tank; the water ring vacuum pump and the blanching chamber are in communication with each other through the first vacuum pipe that is provided between them; a vacuum sensor and a vacuum valve are provided on the first vacuum pipe; the water ring vacuum pump is connected to the water tank through an exhaust pipe and a water pumping pipe; a water inlet duct is connected to a middle of the water tank such that external water enters; a discharge valve is provided at a bottom of the water tank; and the water ring vacuum pump, the vacuum sensor and the vacuum valve are respectively connected to the automatic control system;
   the vacuum steam blancher further comprises a second vacuum pipe; the first vacuum pipe is connected to a waste heat recovery device; the second vacuum pipe is provided between the waste heat recovery device and the water ring vacuum pump; a vacuum check valve is provided on the second vacuum pipe; and the waste heat recovery device and the vacuum check valve are respectively connected to the automatic control system;
   wherein the material conveyor comprises a conveyor bracket and a power source; a photoelectric proximity switch and a plurality of conveyor rollers are fixed on the conveyor bracket; the plurality of conveyor rollers are connected to a conveyor belt; the power source is configured to drive the conveyor rollers to rotate; and the photoelectric proximity switch and the power source are respectively connected to the automatic control system;
   the conveyor bracket comprises a steam reflecting plate which is fixedly connected to a bottom of the conveyor belt; and the steam reflecting plate is configured to reflect steam that passes through the conveyor belt to bottoms of materials; and
   during operation, the materials are transferred into the blanching chamber through the material inlet from an upstream production line, and then transferred, by the material conveyor, to a predetermined position; according to preset process parameters of the automatic control system, the steam generation system and the vacuum system are switched on to blanch the materials; the blanched materials are transferred, by the material conveyor, to the material outlet and then introduced to a downstream production line; and steam condensate is discharged through the drainage system.

2. The vacuum steam blancher of claim 1, wherein the steam generation system comprises a steam generator and a steam pipe; the steam generator and the steam distributor are in communication with each other through the steam pipe that is provided between them; a solenoid valve is provided on the steam pipe; a pressure sensor is provided on the steam generator; and the steam generator, the solenoid valve and the pressure sensor are respectively connected to the automatic control system.

3. The vacuum steam blancher of claim 2, wherein the steam distributor comprises a main pipe and a plurality of branch pipes; the plurality of branch pipes are symmetrically distributed along both sides of the main pipe and are communicated with the main pipe; a plurality of spray holes spaced apart are provided in alignment along each of the branch pipes.

4. The vacuum steam blancher of claim 1, wherein the pressure casing comprises an inner casing and an outer casing; the inner casing is provided in the outer casing; and a plurality of reinforcing ribs are provided between the inner casing and the outer casing.

5. The vacuum steam blancher of claim 4, wherein a thermal insulator is provided between the inner casing and the outer casing.

6. The vacuum steam blancher of claim 1, further comprising a permanent magnetic coupling;
   wherein a drive end of the permanent magnetic coupling is connected to the power source, and a driven end of the permanent magnetic coupling is connected to each of the conveyor rollers.

7. The vacuum steam blancher of claim 6, wherein each of the conveyor rollers is provided with a ceramic bearing.

8. The vacuum steam blancher of claim 1, wherein an inlet valve is provided in the material inlet for material feeding control; and an outlet valve is provided in the material outlet for material discharge control.

9. The vacuum steam blancher of claim 8, wherein the inlet valve and the outlet valve each are a vacuum gate valve with a knife edge.

10. The vacuum steam blancher of claim 8, wherein a feed baffle is provided above the material inlet and the material outlet, respectively; a discharge baffle is provided under the material inlet and the material outlet, respectively; the inlet valve is arranged between the material inlet and the feed baffle of the material inlet; and the outlet valve is arranged between the material outlet and the discharge baffle of the material outlet.

11. The vacuum steam blancher of claim 8, wherein a periphery of the material outlet is connected to a conveyor cover, and a material discharge system is provided in the conveyor cover; and the material discharge system, the inlet valve and the outlet valve are respectively connected to the automatic control system.

12. The vacuum steam blancher of claim 1, wherein the automatic control system comprises a centralized touch-screen controller connected to a programmable logic controller (PLC).

\* \* \* \* \*